United States Patent [19]
Taylor et al.

[11] Patent Number: 6,117,594
[45] Date of Patent: Sep. 12, 2000

[54] ALLOY FOR BATTERY GRIDS

[75] Inventors: M. Eric Taylor, Shorewood; Paul D. Korinek, West Bend; Christian P. Hansen, Eagle, all of Wis.; Albert Toennessen, Idstein, Germany

[73] Assignees: Johnson Controls Technology Company, Plymouth, Mich.; VB Autobatterie GmbH, Hanover, Germany

[21] Appl. No.: 09/337,830

[22] Filed: Jun. 22, 1999

Related U.S. Application Data

[63] Continuation of application No. 09/105,162, Jun. 26, 1998.
[51] Int. Cl.[7] .............................. H01M 4/64; H01M 4/66; B23P 13/00
[52] U.S. Cl. ................................. 429/245; 29/2; 429/233
[58] Field of Search ................... 29/2; 429/233, 429/245

[56] References Cited

U.S. PATENT DOCUMENTS 4,092,462   5/1978  Giess et al. .
4,939,051   7/1990  Yasuda et al. ........................... 429/245
5,691,087  11/1997  Rao et al. ............................... 429/245
5,834,141  11/1998  Anderson et al. ....................... 429/245
5,874,186   2/1999  Rao et al. ............................... 429/242

FOREIGN PATENT DOCUMENTS

1338823  11/1973  United Kingdom .
1400339   7/1975  United Kingdom .

Primary Examiner—Maria Nuzzolillo
Assistant Examiner—Tracy Dove
Attorney, Agent, or Firm—Quarles & Brady LLP

[57] ABSTRACT

A lead acid cell including a positive plate or grid has been discovered involving Pb/Ca/Sn/Ag alloy. An interaction between tin and silver which leads to optimum tin and silver levels which are substantially different than those indicated in the prior art. The described optimum tin and silver levels results in a positive alloy with superior mechanical properties and improved corrosion resistance which leads to superior battery life in present day SLI applications. In a preferred manner, the alloy includes lead, tin in the range of about 0.8% to about 1.17%, and silver in the range of grater than 0 to about 0.015%, the percentages being based upon the total weight of the lead-based alloy.

33 Claims, 7 Drawing Sheets

ALLOY FOR BATTERY GRIDS

CROSS-REFERENCE TO RELATED APPLICATIONS

This is a continuation of Ser. No. 09/105,162 filed Jun. 26, 1998.

STATEMENT REGARDING FEDERALLY SPONSORED RESEARCH OR DEVELOPMENT

Not applicable

BACKGROUND OF THE INVENTION

1. Technical Field

The field of invention is lead-acid storage batteries, and more particularly, a positive plate grid alloy composition composed of lead, at least 0.8% tin and minimum amounts of calcium and silver.

2. Background Art

General requirements for lead/acid batteries, alloys for use in grids, all technologies (bookmold, expanded, stamped, woven and composite) are as follows:

1. Mechanical strength sufficient for the technology, and specifically with sufficient hardening rate and hardness to allow battery production with grids of these alloys with state-of-the-art production technology.

2. Very good corrosion resistance, especially at the high under-the-hood temperature of modern cars.

3. Grids free from casting defects such as hot cracks.

4. Stability of the microstructure (averaging, softening).

5. Stability of grid material against releasing components in the electrolyte which degrades primary cell functioning.

6. Rechargeability.

7. Recycling capability.

Alloys of the Pb/Ca/Sn/Ag system can meet all these requirements, but not all alloy compositions can be used in practice. Amounts of Ca, Sn, Ag and Al need to be selected according to some rules. The principal impact of the basic alloy elements are:

Calcium: Primary hardening agent by different calcium based precipitation reactions. However, too much calcium will cause averaging and unacceptable corrosion rate. Calcium content has to be balanced to get sufficient hardening and tolerable corrosion rate. Without additional alloying agents, alloys without calcium or with very low calcium (<0,06%) are very soft and only usable with special production technologies.

Tin: Adds new precipitation reactions leading to (Pb,Sn)3Ca or Sn3Ca. Homogeneous Sn3Ca precipitate is dominant intermetallic product when the Sn:Ca ratio is greater than 9:1 and provides better corrosion resistance than the discontinuous (Pb,Sn)3Ca precipitate which is dominant at lower Sn:Ca ratios. (References: German patent DE2758940 of Assmann 1979; Assmann and Borchers, Z. Metallkunde 69 (1978), pages 43–49; Bouirden, Hilger, and Hertz, J. Power Sources 33, (1991), pages 27–50; Prengaman 7th Int. Lead Conf. Pb '80; Power Sources 67, 1997 267–278). Also, improves rechargability by increasing the conductivity of the corrosion layer. (References: H. Giess in Proc. Symp. Advances in Lead Acid Batteries 84–14, Electrochem. Soc. 1984; Miraglio et. al., J. Power Sources 53, 1995, 53–60); and stabilizes a wrought microstructure. (Reference: Prengaman U.S. Pat. No. 3,953,244).

Aluminum: Reduce calcium loss in melt pots.

Silver:

1. Increasing mechanical strength, especially creep strength of grain boundaries (Prengaman).

2. Increasing hardening rates (Assmann), which makes low or medium calcium alloys a possible option in terms of productivity.

3. Increased hot cracking as described by Gene Valeriote, (1995) 6th Asian Battery Conference.

4. Decreased oxygen overpotential.

Only some combinations Pb/Ca/Sn/Ag are used for the special needs of battery components:

1. PbCa binary: Ca 0.08–0.12%; fast hardening, but fast averaging and corresponding high corrosion rate. Used in the form of book mold grids, drum cast strip or wrought strip for Negatives.

2. High Ca, low Sn: Typical Ca 0.08% Sn 0.3%; In use world wide for book mold grids. Fast hardening, but averaging caused by discontinuous precipitation reaction resulting in (local) softening and pretty high corrosion rate. Easy to handle in production, but not meeting today's service life expectations under-high temperature, high stress conditions, especially for thin SLI battery grids.

3. High Ca, high Sn: Ca 0.06–0.10%, Sn 0.8–1.5%, Sn:Ca>9:1 with the preferred homogenous Sn,Ca precipitation reactions. Microstructure with better stability compared to low Sn; Corrosion rates still significantly higher than those for Ca free lead alloys.

4. Low Ca, low to medium Sn: 0.025–0.06% Ca, 0.3–0.5% Sn. According to rule Sn:Ca>9:1 with preferred $Sn_3Ca$ precipitation. Improved corrosion resistance, but reduced hardness and stiffness of grids hinder use for thin SLI grids, but in use for thick industrial battery grids. Use in thin grids especially expanded metal only with the addition of greater than 150 ppm Ag (preferred greater than 200 ppm Ag) is required to improve handling for thin SLI grids. This is indicated in the subsequently referred to U.S. Pat. Nos. 5,298,350; 5,434,025; and 5,691,087.

5. PbSn binary: Calcium free PbSn alloys used for strap material. Generally too soft to be suitable for conventional SLI plate making technologies. Has been used in large industrial batteries and in spiral wound configurations.

In the present SLI application, the ultimate life of a lead acid battery is largely determined by the positive grid alloy. Several factors contribute to making the positive grid the life limiting component of the battery: 1) highly oxidizing potential created by the presence of the positive active material and sulfuric acid, 2) high temperatures accelerating the grid oxidation due to the battery being enclosed in a confined space in close proximity to the ICE engine, 3) relatively poor conductivity of the active material placing most of the current carrying burden on the Pb grid member, and 4) relatively poor match of the crystal structure of the active material compared to the Pb grid to which is must be in electrical contact. For this reason, the alloy of the positive grid has been the subject of a large body of literature and patents.

Today most SLI positive grids are made of Pb/Ca/Sn or Pb/Ca/Sn/Ag alloys. These alloys have won favor over the traditional Pb/Sb alloys in the market place due to their lower water loss and are often referred to as "maintenance free". The Pb/Ca/Sn ternary alloy has been studied extensively. At this point, it is clear that the overall corrosion rate for this ternary alloy is controlled by two key factors: 1)Ca concentration, and 2) the ratio of the Sn/Ca concentration in the alloy. Keeping the calcium concentration as low as possible significantly reduces the corrosion rate, while maintaining the Sn to Ca concentration ratio greater than 9:1 reduces the amount of Pb₃Ca intermetallic in favor of Sn3Ca and reduces the tendency for discontinuous precipitation. As a result, one of the most successful strategies for improving the positive grid alloy was to use as little Ca as necessary to produce an alloy which age hardened sufficiently fast to an adequate hardness to survive the manufacturing process without damage. Following this approach, the corrosion rate was reduced to the lowest practical limit while simultaneously reducing the amount of expensive Sn necessary to keep a favorable Sn/Ca ratio. It has been found that the composition of positive grid alloys typically used in SLI batteries prior to 1993, that the practical range for calcium was 0.07% to 0.10% Ca with associated tin ranges from 0.6% to 1.3% Sn.

A smaller body of work has explored some aspects of the Pb/Ca/Sn/Ag quaternary alloy system with implications for positive battery grid applications (German patent DE2758940 of Assmann, 1979). More recently, in U.S. Pat. Nos. 5,298,350 and 5,434,025 a lead alloy is described containing 0.3–0.7% tin and 0.015–0.045% silver. U.S. Pat. No. 5,691,087 also discloses a similar composition. However, the amount of tin is 0.3 to 0.9% with the amount of silver being the same as in the previously discussed patents, i.e. 0.015 to 0.045%.

The most important advantage gained from addition of silver to the Pb/Ca/Sn alloy has been the ability to increase the age hardening rate of the alloy when the Ca level is 0.06% or less such that thin SLI grids can be manufactured using conventional processing equipment after an acceptable heat treatment period. Unfortunately, most of the work reported to date, including in the file of U.S. Pat. No. 5,298,350 a declaration by Rao, has drawn conclusions from data on common ternary Pb/Ca/Sn alloys doped with various levels of silver. Based on the best data available at the time, the previously referred to patents concerning the Pb/Ca/Sn/Ag alloy disclosed that positive grid alloys having less than 0.015% silver would possess only marginal mechanical properties even after heat treatment and positive grid alloys having tin in excess of 0.7% would have unacceptable service life.

It is one of the important discoveries of the present work that by using tin at a relatively high level, as well as a high ratio of tin to calcium, the use of silver is not a major factor in such features as rapid hardening for manufacturability, hardness and low corrosion rate for extended service life. Silver is expected to improve creep resistance, but the level can and must be restricted to less than 0.02% by weight to obtain good quality grids. This finding represents an unexpected and unreported interaction of tin and silver in this alloy system. As a direct result of this interaction, the optimum tin and silver composition is placed precisely at levels previously reported to be unacceptable for good service life of a lead acid battery (see U.S. Pat. No. 5,298,350).

BRIEF SUMMARY OF THE INVENTION

In one aspect the invention provides a lead-acid cell comprising a container with at least one positive plate and a negative plate disposed within the container. A separator is disposed within the container and separates the positive and negative plates. An electrolyte is in contact with the separator and the plates. The positive plate includes a grid supporting structure having a layer of active material pasted thereto. The grid supporting structure is composed of a lead-based alloy including lead, tin in the range of about 0.8% to less than about 1.2% and preferably about 1.1%, tin in a ratio to calcium of greater than about 12:1 and silver in the range of about 0 to about 0.017%, the percentages being based upon the total weight of the lead-based alloy.

In another aspect, the ratio of tin to calcium is not less than 15:1.

In yet another aspect, the ratio of tin to calcium is not less than 20:1.

In one preferred form, the silver content of the alloy is in the range of about 0.005% to about 0.017%.

In another preferred form calcium is present in the range of about 0.03% to about 0.055%, and the ratio of tin to calcium is not less than 15:1 with silver present in a range of 0.005% to 0.017%.

In still another preferred form, the calcium is present in the range of 0.03% to 0.055%, and the ratio of Win to calcium is not less than 20:1 with silver present in the range of 0.008% to 0.015%.

In still another aspect, the container, positive and negative plates and the separator comprise an automotive battery.

In yet still another aspect, a grid supporting structure with the previously described alloy can be employed in various types of lead-acid batteries.

The objects of the invention therefore include:

a. providing an alloy for a grid supporting structure in a battery cell wherein the grid has a rapid hardening for manufacturability;

b. providing an alloy of the foregoing type which has excellent hardness;

c. providing an alloy of the foregoing type which has low corrosion rate for extended service life;

d. providing an alloy of the foregoing type which has improved casting quality with minimum hot cracking susceptibility; and e. providing an alloy of the foregoing type which is particularly suited for use in a lead acid battery.

The foregoing and other objects and advantages of the invention will appear from the following description. In the description, reference is made to the accompanying drawings which form a part hereof, and in which there is shown by way of illustration preferred embodiments of the invention. Such embodiments do not necessarily represent the full scope of the invention. Therefore, reference is made to the claims herein for interpreting the scope of the invention.

DETAILED DESCRIPTION

Alloy selection according to this invention provides a set of rules describing a range of calcium, tin and silver content which gives an optimum balance between the need to get hardening and strength by calcium-based precipitation reactions and to reduce the corrosion-enhancing calcium content as far as possible.

The impact of calcium on the corrosion weight loss is dramatic. This is known for high calcium alloys (0.08–0.13%) but is true even at low calcium content. Tests reveal the results of overcharge weight-loss measurements for 0 to 0.08 wt-% calcium. These would favor the use of very low calcium contents.

But the use of calcium <0.06%, especially for the thin SLI-positive grids and even with tin according to the rule Sn:Ca >9:1, is not recommended in practice because the achievable strength and hardening rates do not meet the need to withstand the stresses during production of plates and during the service life of batteries.

The only known way to use the advantage of low calcium (<0.06%) is the addition of remarkable amounts of silver as disclosed in the previously referred to U.S. Pat. Nos. 5,298,350; 5,434,025; and 5,691,087 (200–600 ppm, preferably 300–450 ppm). These patents claim a narrow range for tin: 0,3–0,7 (–0,9 for sealed) and silver (200 (150)–600 ppm) because they report that lower salver or higher tin both turned out to yield unacceptable grid stability or service life. Especially 0.015 or lower silver content isn't possible because grids are not producible with state-of-the-art technologies.

Surprisingly it has been found as one aspect of the present invention that calcium <0.06% is possible in state-of-the-art SLI battery grids without using that high silver content if the tin content is balanced in the right way. Tests were conducted to show the impact of tin for calcium–0.04% on the final hardness for silver additions from 0 and =0.03%. The maximum hardness is achieved for Sn:Ca >20:1. The maximum hardness with and without silver is almost 30% higher than that in alloys with Sn:Ca at approximately 12:1. This means that the mechanical strength of alloys with 0.06% calcium or more is achievable with a low calcium content like 0.04% if the tin concentration in the microstructure is high enough. Compared to this bonus of high tin content, the additional strengthening by adding silver is negligible.

Even more dramatic is the advantage of increased tin contents in terms of hardening rate. Tests were conducted to show the time needed to get 90% of the maximum hardness at 180° F. heat treatment. It was very surprising that the maximum time, i.e., the slowest hardening rate, is needed exactly around the state-of-the-art tin to calcium ratio of 12 to 1.

But these data can easily explain the claimed need for high silver contents in low calcium alloys (<0.06% Ca). Silver is accelerating the hardening rate by a factor of 2 if tin to calcium is in the 12 to 1 range. This explains the reason Assmann and the referred to U.S. patents are claiming the positive effect of silver in PbCaSn alloys in that range.

It has been found by the inventors that the use of low calcium alloys without the need to add large amounts of silver is possible in practice if there is a sufficient "surplus" amount of tin available for the hardening reactions. These "low calcium-high tin" alloys are favorable in terms of balancing corrosion resistance and strength and do meet the needs of the production technologies. Silver addition is expected to give additional advantage by increasing creep resistance for thin grids subjected to high temperature service. The silver content can and must be less than 0.02% Ag by weight to produce good quality grids.

The second aspect of this invention is the adaption of the usual Sn:Ca rules for low calcium alloys. The known composition rules like Sn:Ca >9:1 to avoid the discontinuous Pb3Ca precipitation don't meet the practical need for high strength and fast hardening if calcium is reduced to levels around 0.04% and lower. These ratios must be adjusted to the lower Ca content to make the necessary surplus of tin available in the lattice. That means more tin is needed as the calcium is reduced to build up the intermetallic precipitates necessary to get the required strengthening effect from the smaller amount of calcium. As a result, the optimum ratio of Sn to Ca will greatly exceed the 9:1 and even the preferred 12:1 previously reported. The state-of-the-art rules are teaching that reducing the amount of tin when reducing the amount of calcium is acceptable as long as the ratio tin to calcium is kept constant. Results show that this strategy is wrong because the amount of hardening precipitates is too greatly reduced to get sufficient strength and hardening rate on the way. The new rule is: The tin content must be increased instead of reduced if calcium is reduced. The previously referred to hardening data shows that there is in fact a critical tin to calcium ratio for that specific calcium content. Full hardness by full use of the calcium atoms diluted in the crystal lattice can be achieved only if there are enough tin atoms around. The less calcium there is, the more tin is needed to get the full hardening action.

The third aspect found is that less silver is necessary in low calcium alloys if the tin concentration is above the critical value. State-of-the-art patents are teaching that silver is essential for these types of alloys and is critical for both good service life and acceptable grid quality. Corrosion rate measurements made under high temperature overcharge conditions show that if the reduction of silver under the critical limit of 150–200 ppm described in the previously referred to U.S. patents will reduce the corrosion resistance for alloys following the new tin to calcium rule. The surprising result was that alloys in the "low calcium-high tin " area show, in fact, a slight increase in corrosion rate with increasing silver content.

Similar to the need to balance the positive effect of calcium in terms of strength with the negative effect of increased corrosion rate, there is the need to limit silver to get superior service life if corrosion of the positive is the limiting factor. Test results show that a reduced silver content (50–200 ppm) is favorable in terms of corrosion for low calcium high tin alloys. As long as the tin to calcium ratio is above the critical limit to get full hardness, the choice of whether or not adding silver is driven only by the need to get some additional creep resistance (silver at grain boundaries).

Aluminum might be added according to the needs of the grid production technology (calcium loss).

The hardening rate and maximum hardness are both important for a grid alloy. Increasing the age hardening rate of an alloy facilitates high rate, high volume battery production by shortening the time required for the alloy to achieve acceptable strength for processing, thereby keeping grid inventories acceptably low. Increasing the maximum hardness of the alloy improves its ability to be processed and assembled into the final battery without significant damage. Hardness can also improve the plates durability and thereby reduce the risk: of vibration damage in service. Increasing both the hardening rate and maximum hardness without sacrificing corrosion resistance tends toward improving overall battery quality.

In addition to the maximum hardness of the grid alloy, automotive battery life is also impacted by corrosion of the grid structure of the positive plate.

Since the average driver drives –70 minutes a day, approximately 5% of the time the battery experiences the charging voltage of the alternator (overcharge voltage typically occurs). Most importantly, this charging voltage acts in conjunction with the rather high under hood temperatures of modern vehicles during operation. The remaining 95% of the time the battery is at its rest voltage (open circuit). While the open circuit potential begins at the high operating temperature of the vehicle, it quickly begins to cool towards the ambient air temperature. These two conditions of the positive grid are simulated in accelerated lab corrosion tests to evaluate the positive grids alloys for their potential to extend battery life. Reasonable correlation between accelerated lab corrosion tests and follow up studies of battery life at 167° F. has been demonstrated.

Taken together, the above parameters provide a good basis for evaluating the quality of a positive grid alloy for a lead acid battery. In order to evaluate the optimum tin and silver levels for manufacturability and extending life of the lead acid battery, a statistically designed experiment with 4 levels of tin and silver was completed for the purpose of generating a response surface for each of the important parameters. The alloys included in the designed test are listed in Table 1.

TABLE 1

Alloy Composition in Designed Studies

| Tin (%) Nominal | Silver (%) Nominal | Tin (%) Actual | Abs. Dev. From Nom. (% Sn) | Silver (%) Actual | Abs. Dev. From Nom. (% Ag) |
|---|---|---|---|---|---|
| 0.300 | 0.000 | 0.336 | 0.036 | 0.000 | 0.000 |
| 0.300 | 0.030 | 0.258 | (0.042) | 0.033 | 0.003 |
| 0.300 | 0.070 | 0.295 | (0.005) | 0.077 | 0.007 |
| 0.300 | 0.100 | 0.289 | (0.011) | 0.104 | 0.004 |
| 0.550 | 0.000 | 0.544 | (0.006) | 0.000 | 0.000 |
| 0.550 | 0.030 | 0.558 | 0.008 | 0.034 | 0.004 |
| 0.550 | 0.070 | 0.559 | 0.009 | 0.071 | 0.001 |
| 0.550 | 0.100 | 0.538 | (0.012) | 0.103 | 0.003 |
| 0.680 | 0.050 | 0.723 | 0.043 | 0.050 | 0.000 |
| 0.800 | 0.000 | 0.799 | (0.001 | 0.000 | 0.000 |
| 0.800 | 0.030 | 0.795 | (0.005) | 0.028 | (0.002) |
| 0.800 | 0.070 | 0.748 | (0.052) | 0.100 | (0.001) |
| 1.050 | 0.000 | 1.030 | (0.020) | 0.000 | 0.000 |
| 1.050 | 0.030 | 1.164 | 0.114 | 0.032 | 0.002 |
| 1.050 | 0.070 | 1.121 | 0.071 | 0.070 | 0.000 |
| 1.050 | 0.100 | 1.088 | 0.038 | 0.092 | (0.008) |

I. Age Hardening Studies

Tests to determine the impact of the Sn and silver concentration on the rate of age hardening and maximum hardness were completed on all of the alloys of Table 1. Alloys were cast in a gravity cast mold under conditions which produce a cast microstructure which mimics the microstructure of the gravity cast grid. The Pb pot temperature was maintained at 400° C. and the mold temperature was maintained at 400° F. Samples of the cast material were mounted in epoxy. Following curing of the epoxy mounts, typically 18 to 20 hours, the samples were stored at 180° F. and removed periodically for Vickers hardness determination. Samples typically hardened rapidly for the first 10 to 50 hours at 180° F. and then leveled off at a maximum hardness typically within 100 hours at 180° F. Typical examples of the hardness as a function of time at 180° F. are shown in the chart of FIG. 1.

Figure 1:
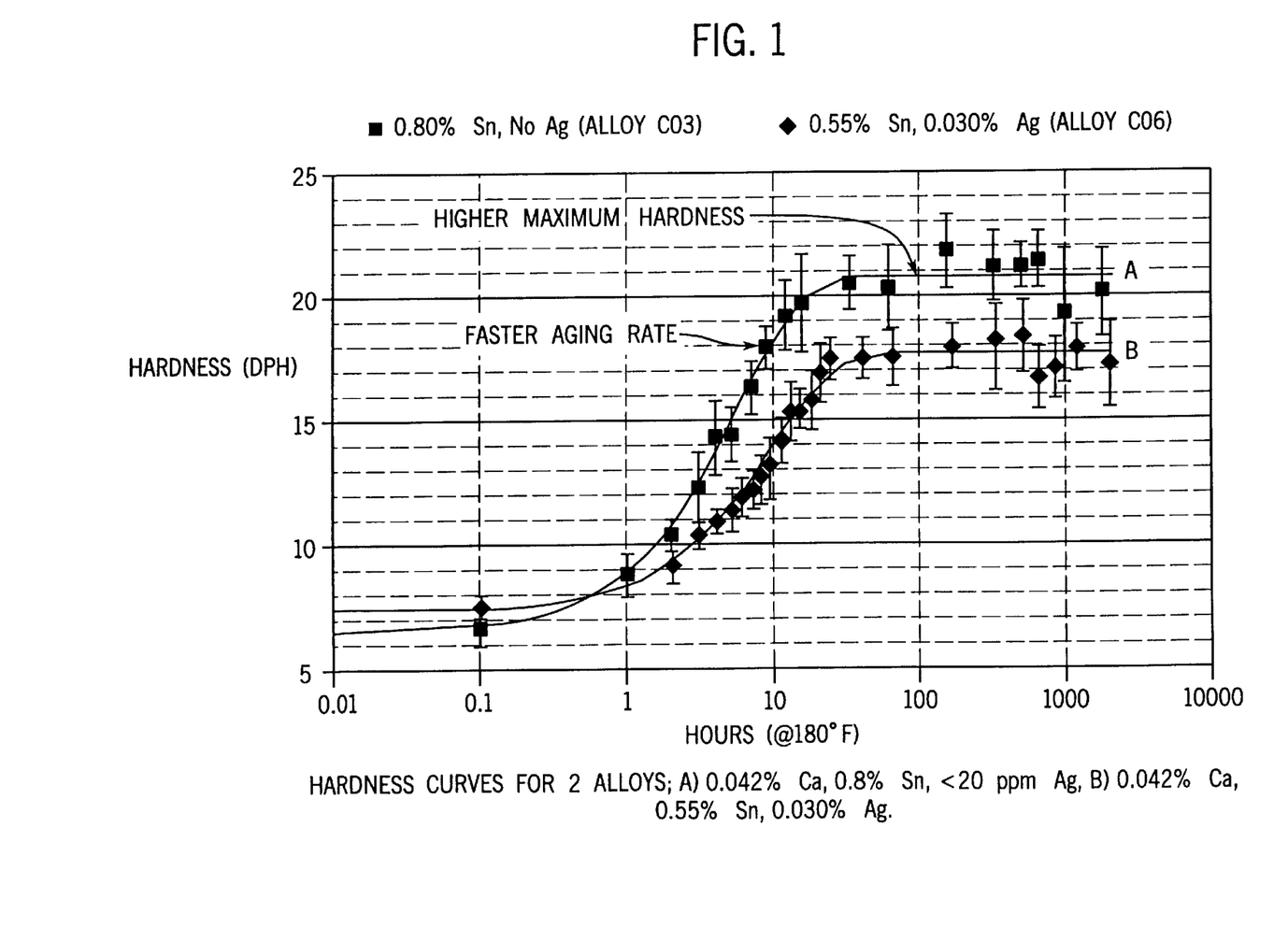
FIGS. 1–5 are charts illustrating certain test results of alloys using various amounts of tin and silver.

Data shown in FIG. 1 is well described in an equation of the form:

$$\text{Hardness} = H_c + A(1 - e^{-Q \cdot t}) \qquad \text{Equation 1}$$

For each alloy, the three adjustable parameters, $H_c$, A, and Q, were estimated and used to calculate the maximum hardness and the time required to reach 90% of the maximum hardness according to:

$$\text{Maximum Hardness} = H_c + A \qquad \text{Equation 2}$$

and $$\text{Time to 90\% Maximum Hardness} = \frac{1}{Q} \cdot (2.303 - 1n\,[1 + H_o/A]) \qquad \text{Equation 3}$$

Figure 2:
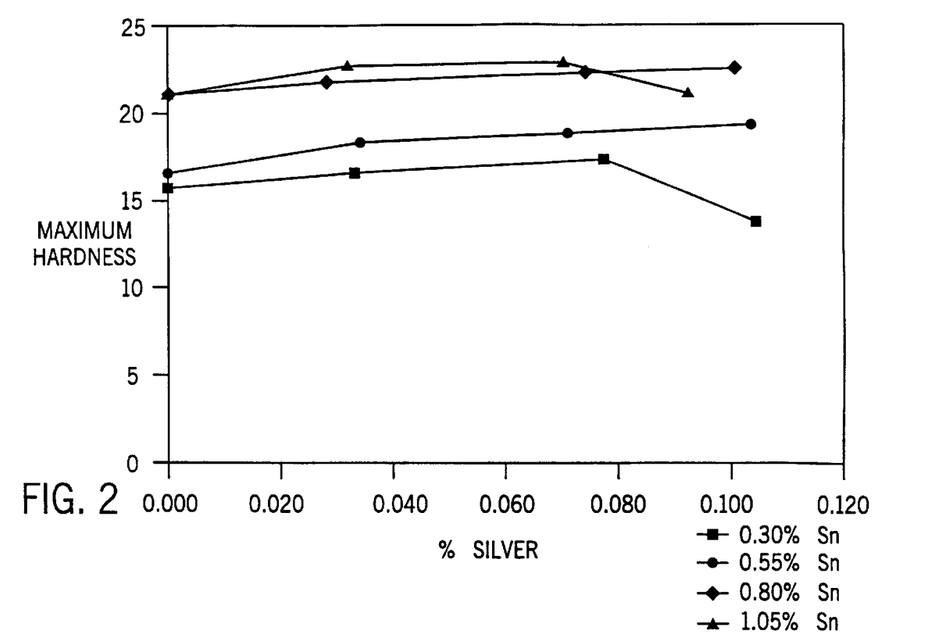
Figure 3:
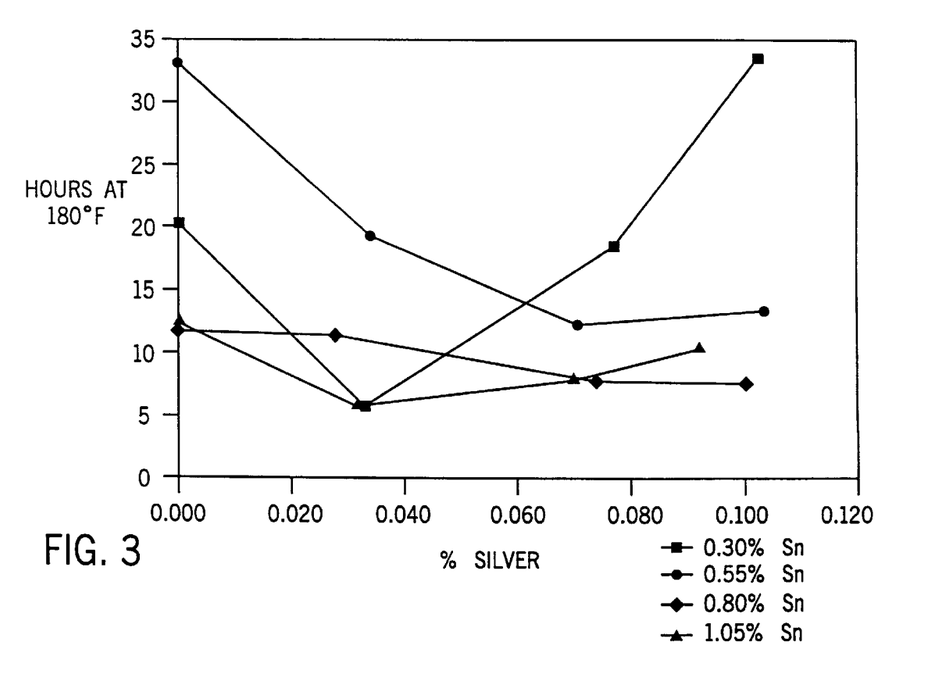

Analysis of the Maximum Hardness ($H_{max}$) and the Time to 90% Maximum Hardness ($T_{90}$) for each of the alloys of Table 1 is shown in Table 2. The maximum hardness of the alloy depends most strongly on the Sn concentration alone. The most significant increase in the maximum hardness occurred when the Sn was increased from 0.55% to 0.80%. This increase in tin resulted in an average increase in hardness from 18 to 22 DPH (Diamond Pyramid Hardness). Further increasing the 30 tin to 1.05% did not significantly improve the hardness further. FIG. 2 clearly illustrates these trends. The hardening rate of the alloy with 0.55% Sn was significantly increased by the addition of silver. When the Sn concentration was at 0.80%, the hardening rate was as good without any silver as the 0.55% Sn with silver. This trend is clearly seen in FIG. 3.

TABLE 2

Maximum Hardness and Hardening Rate.

| Tin (%) Nominal | Silver (%) Nominal | Max. Hard. (DPH) | Time to 90% Max. Hard. (Hours) |
|---|---|---|---|
| 0.300 | 0.000 | 15.5 | 20.0 |
| 0.300 | 0.030 | 16.2 | 5.6 |
| 0.300 | 0.070 | 16.9 | 17.9 |
| 0.300 | 0.100 | 13.4 | 33.9 |
| 0.550 | 0.000 | 16.3 | 33.0 |
| 0.550 | 0.030 | 18.0 | 19.0 |
| 0.550 | 0.070 | 18.4 | 12.0 |
| 0.550 | 0.100 | 18.9 | 13.0 |
| 0.680 | 0.050 | 20.4 | 12.4 |
| 0.800 | 0.000 | 20.9 | 11.7 |
| 0.800 | 0.030 | 21.5 | 11.3 |
| 0.800 | 0.070 | 22 | 7.8 |
| 0.800 | 0.100 | 22.1 | 7.4 |
| 1.050 | 0.000 | 20.8 | 12.4 |
| 1.050 | 0.030 | 22.5 | 5.9 |
| 1.050 | 0.070 | 22.6 | 7.9 |
| 1.050 | 0.100 | 20.8 | 10.2 |

II. Castibility Study

From a battery producers view, it is essential to ensure good grid quality while maintaining acceptable production rates. In particular, cast grids must be free of porosity, cracks, and similar casting defects. Valeriote (Valeriote, 6th Asian Battery Conference proceedings) was the first to mention the increasing tendency for hot cracking in Pb/Ca/Sn/Ag alloys because Ag increases the freezing range of the alloys. In fact, the propensity for hot cracking required the development of a new type of strip caster to manufacture strips of the alloys claimed in the previously referred to patents (U.S. Pat. Nos. 5,298,350; 5,434,025; and 5,691,087).

A series of gravity cast tests were completed to examine the propensity of the alloy of the present invention for similar casting defects using state-of-the-art book mold gravity casting technology. Table 3 below gives as an example the results of increasing the Ag content in one of the preferred alloys of the present invention with Ca about 0.04% and Sn about 0.9% (Sn:Ca ratio of about 22:1) on the grid quality.

TABLE 3

Cast Grid Quality Evaluation.

| Alloy | Sn % (Actual) | Ag % (Actual) | Ca % (Actual) | Hot Cracking/Grid Quality |
| --- | --- | --- | --- | --- |
| 1 | 0.947 | 0.0030 | 0.040 | no hot cracks/excellent |
| 2 | 0.938 | 0.0124 | 0.039 | no hot cracks/excellent |
| 3 | 0.849 | 0.0219 | 0.039 | first hot cracks/marginal |
| 4 | 0.856 | 0.0375 | 0.039 | hot cracks/not acceptable |
| 5 | 0.0665 | 0.0650 | 0.044 | hot cracks/not acceptable |

Using the same typical SLI grid geometry and the casting conditions, there is an increasing tendency for hot cracking as the silver is systematically increased. For the Sn content of the present invention, it is clear that utilizing a Ag content of 200 ppm or below results in good to excellent grid quality. The first hot cracks were found for Ag around 220 ppm. The preferred Ag content of the previously referred to patents turned out to yield an unacceptable grid quality. This finding may explain one of the reasons for the limit on Sn in the recent Pb/Ca/Sn/Ag patents.

Alloy 5 in Table 3 was used to check if a very high Ag level is castable if the high Sn content is reduced below the 0.8% limit. Gravity casting this alloy resulted in very severe hot cracking and is not usable with today's gravity cast technology.

III. Corrosion Studies

Figure 4:
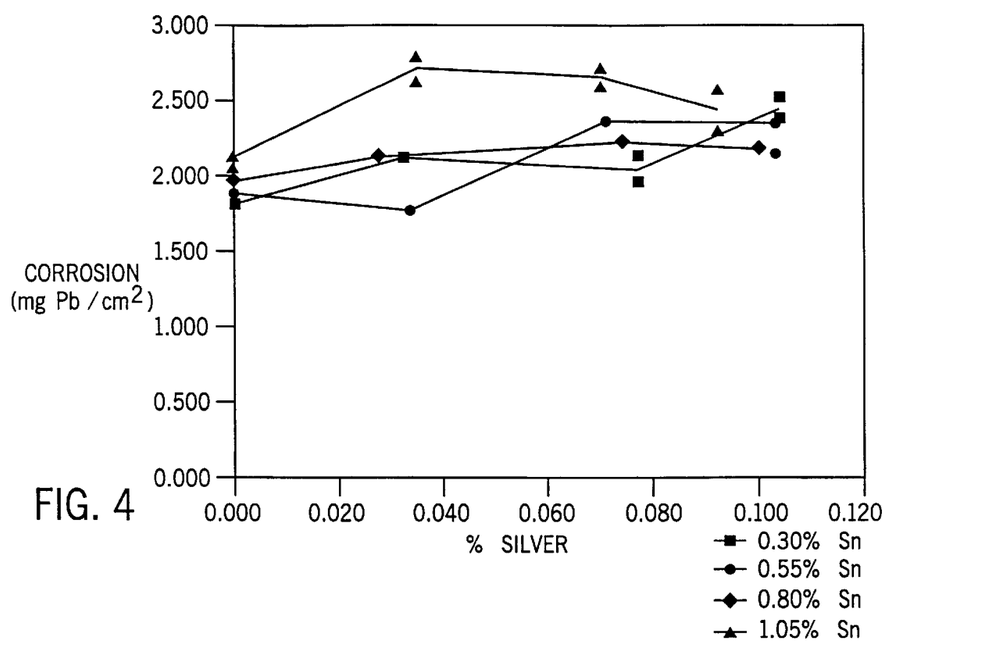
Figure 5:
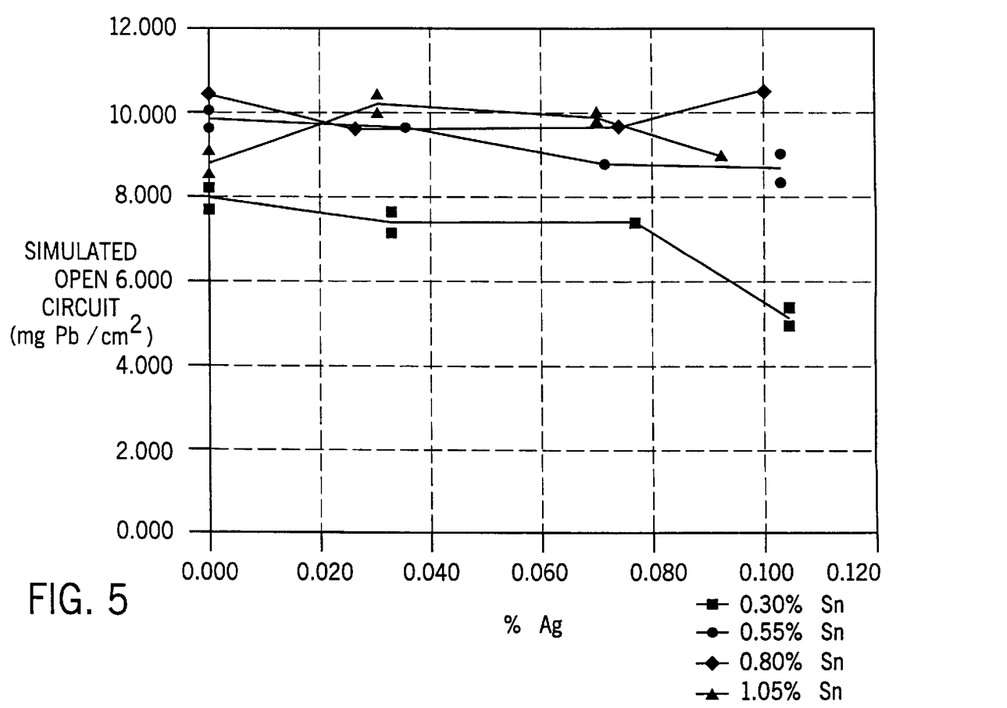

Each of the alloys of Table 1 were corroded at 60° C. for five days at a simulated charging voltage (1.35 V vs. $Hg/Hg_2SO_4$) and a simulated open circuit voltage (1.14 vs. $Hg/Hg_2SO_4$). These results are shown in FIG. 4 and FIG. 5 below. Silver appears to have a small negative impact on the overcharge corrosion regardless of the Sn content. For levels of tin of 0.55% and higher, silver appears to have no impact on the open circuit corrosion rate. At the lowest level of Sn (0.30% Sn) silver appears to reduce the extent of open circuit corrosion. Evidence from other studies has shown that discontinuous precipitation is reduced by addition of silver. Hence, the improvement in the open circuit corrosion rate may be due to the reduction in the $Pb_3Ca$ content. This would not be expected to be important for the higher tin content alloys which favors the $Sn_3Ca$ precipitate where our data shown no beneficial effect of silver.

The high tin low silver range provide the best combination of properties for extended positive grid life in today's SLI application. All of the hardness and corrosion data was statistically optimized to identify the positive grid alloy which provides the best overall characteristics and thereby provide the best trade off of manufacturability and product life. Results show that to simultaneously maintain, a) corrosion rate of the alloy to <2.1 mg $Pb/cm^2$, b) the hardness above 21 DPH, and c) hardening rate below 12 hours at 180° F. to 90% of maximum hardness, the Sn must be above 0.87% and Ag below 0.0165%. This region is clearly shown in FIG. 6. Also, from FIG. 6 it is clear that raising the tin level further and diminishing the Ag level can preserve the advantageous combination of properties in the alloy. Hence the critical range is Ag 0.02% or less and the tin at 0.8% or higher.

Curve CO shows the points of a corrosion rate of 2.1 mg $Pb/cm^2$. Below this curve the corrosion rate is less depicted by $CO^+$ in FIG. 6. The connection point of the CO-line with the abscissa lies at 1.04% Sn. The; actual Sn concentrations are within the range of 0.258% and 1.164% at the right border of the drawing.

Figure 6:
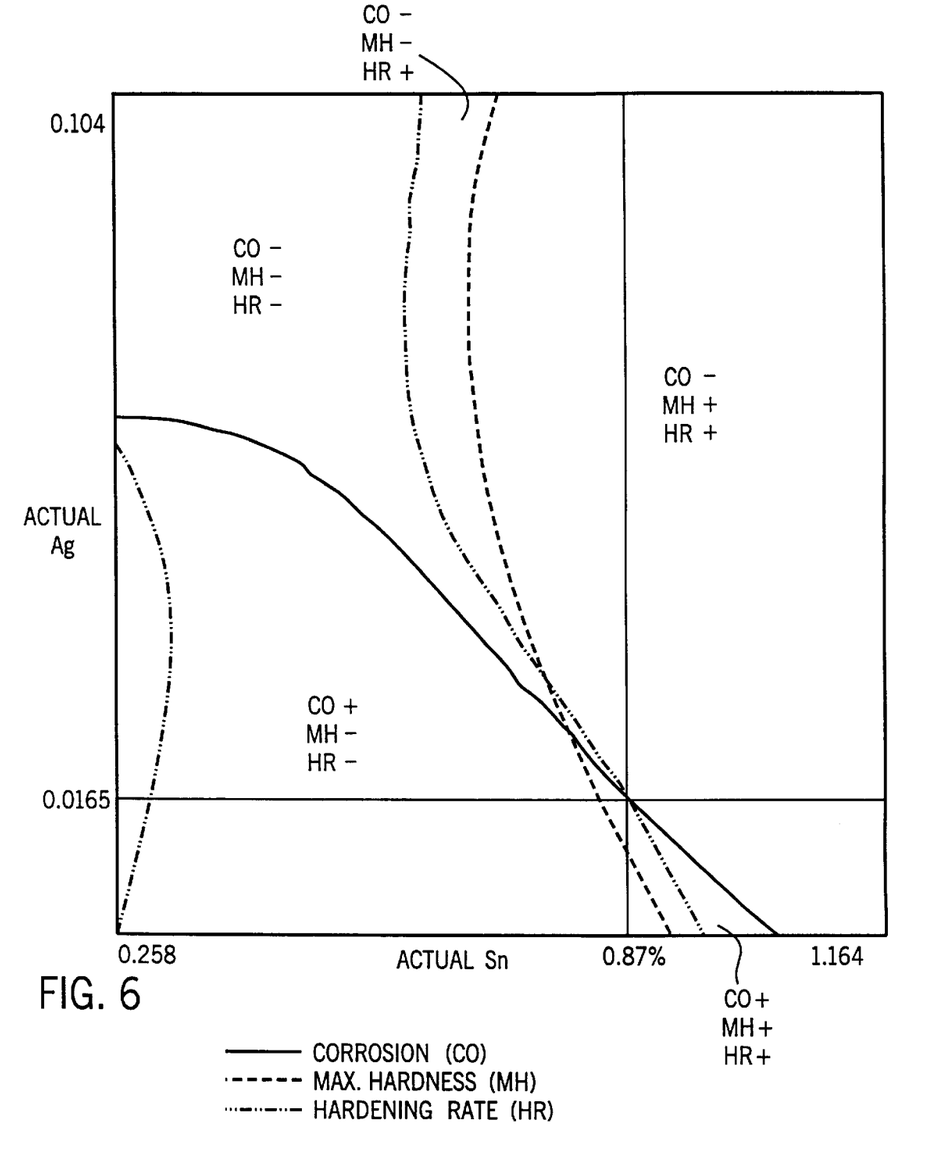
FIG. 6 is a chart illustrating certain critical parameters for the alloy of this invention.

The curve HR shows the points where a hardening rate of 12 hours to reach 90% maximum hardness is needed. To the right of this curve depicted by $MH^+$ are regions with faster hardening rate. The curve MH shows the points of a maximum hardness of 21 DPH. On the right side of this curves lies the regions (MH+) where better maximum hardness can be reached.

To achieve good results in all these three fields namely in corrosion, hardening rate and maximum hardness an alloy should be chosen in a region where the tin content is less than about 1.2% or 1.164% as shown in FIG. 6. The silver content should be below 0.0165% respectively below 0.017%. Preferred tin contents are in the range of about 0.8% to about 1.1%. Preferred silver contents are in the range of 0.005% to less than 0.017% or 0.0165% as shown in FIG. 6. To avoid hot cracking sensibility (see results in Table 3) it is preferred to use low silver contents-in the range of about 0.0005% to about 0.012%.

Figure 7:
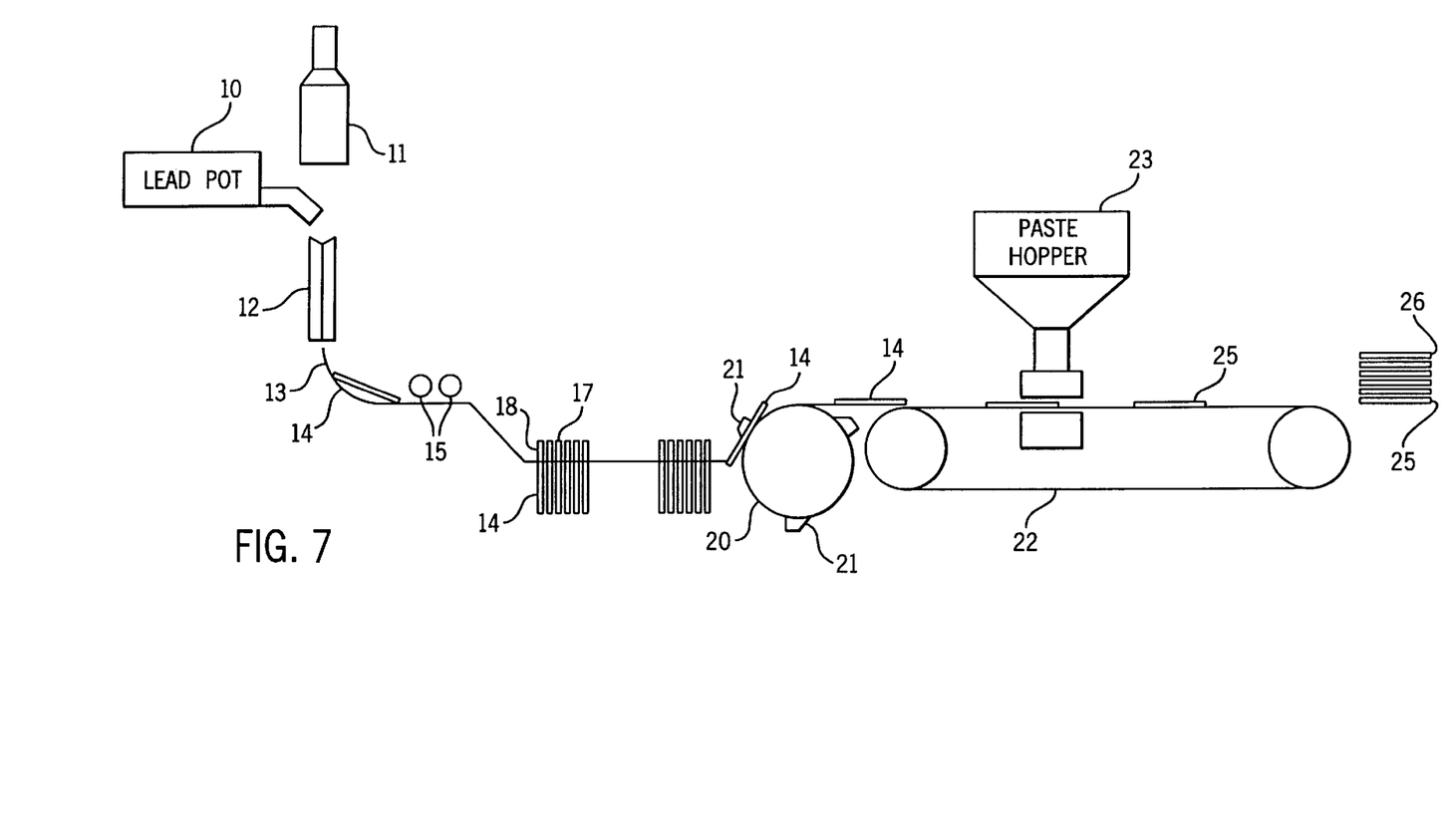
FIG. 7 is a diagrammatic view of process for producing a supporting grid from the alloy of this invention.

The alloys of the present invention may be produced in the conventional manner by adding the constituents to molten lead in the prescribed amounts and mixing to obtain a homogenous melt. In a preferred manner, 0.95% tin, 0.01% silver, 0.045% calcium and 0.015% aluminum are added to the molten lead. The percentages are based upon the total weight of the lead alloy. A preferred method for casting the alloy of this invention, as well as pasting the resulting grid, is shown in FIG. 7. A lead pot 10 is shown with a vent 11. The temperature in the lead pot 11 should be maintained between 910° F. and 1010° F. Besides the specified Ca, Sn and Ag ranges, 80 ppm to 180 ppm Al should be added to prevent excessive loss of calcium during processing. The alloy is poured into a bookmold 12 of a gravity grid casting machine where the mold is maintained between 360° F. and 420° F. Grids of the specified alloy are cast at comparable rates to other alloys in common use in the industry.

The resulting cast grid or grid supporting structure 14 is positioned on conveyor 13 which is moved by rollers 15. They are stacked as shown at 17 and maintained on conveyor by the lugs 18. The grids are then advanced to a grid feeder 20 having dogs 21 which move the grids 14 onto conveyor 22 which positions them under a paste hopper 23 where the usual positive paste is applied. After pasting, the pasted grids 25 are stacked as shown at 26.

Figure 8:
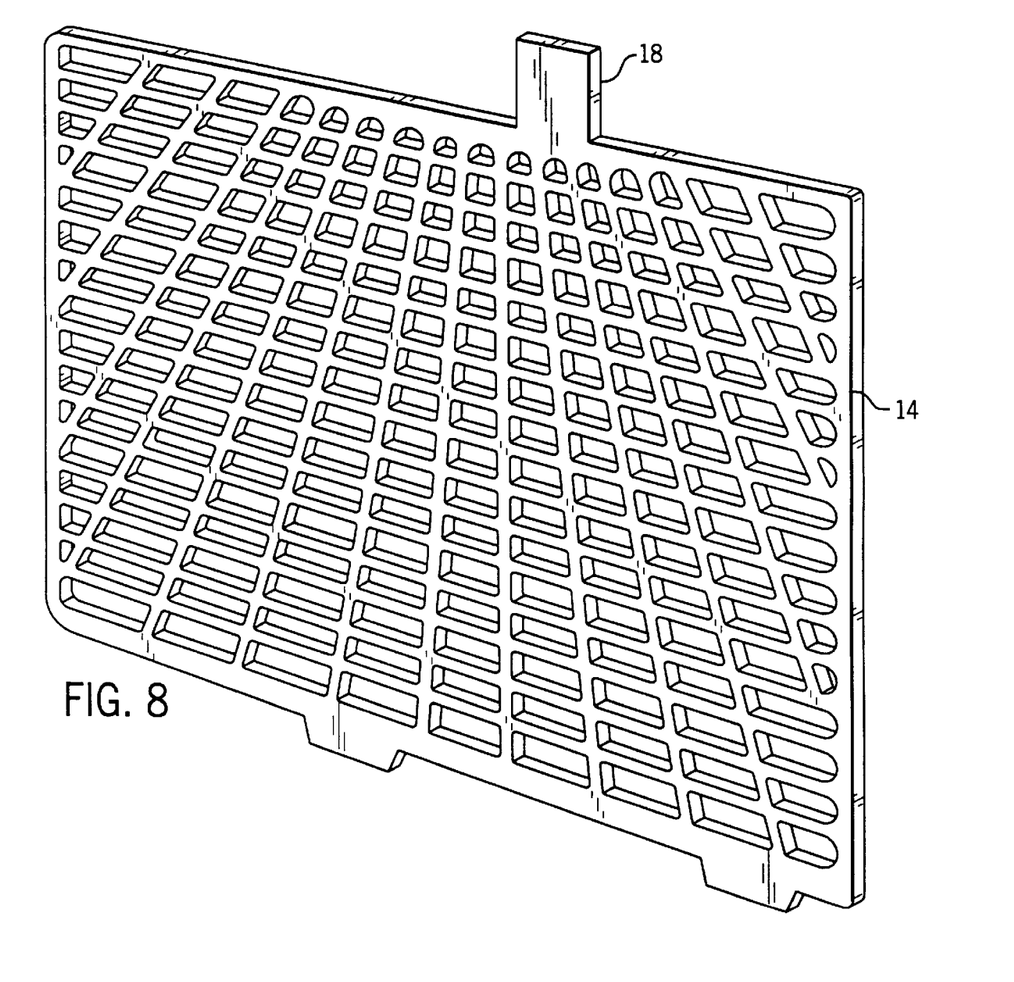
FIG. 8 is an elevational view of a supporting grid made from the alloy of this invention.
Figure 9:
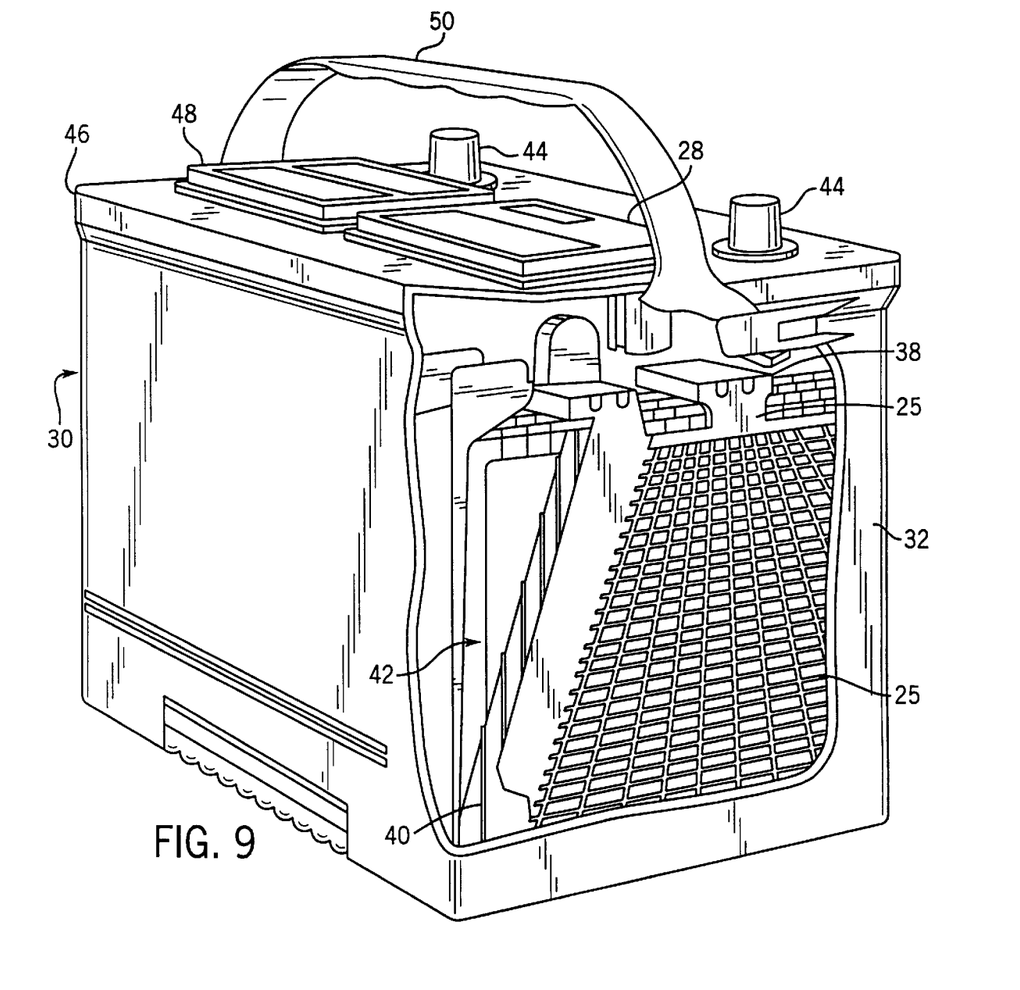
FIG. 9 is a perspective view of a typical battery employing the supporting grid of this invention.

The grid 14 is shown in an enlarged view in FIG. 8 with the typical lug 18. It is utilized in a typical maintenance free SLI lead-acid battery as shown at 30 n FIG. 9. The battery includes the usual container 32 with the plates 25 joined together by the strap 38. The plates have the separators 40 therebetween and are joined together with alternate negative and positive plates into element 42. The battery also includes the usual cover 46 with a gang vent caps 48 and the carrying strap 50. There are also the standard terminals 44 and electrolyte contacting the plates and separators.

While specific amounts of tin, silver, calcium and aluminum have been previously described as a preferred alloy, these amounts can vary as follows, for example:

The silver content can range from 0.005% to 0.017%. The amount of tin can range from 0.8% to 1.5% with a tin ratio to calcium greater than 12:1.

Alternatively, the calcium can be present in an amount of 0.03% to 0.055% with the ratio of tin to calcium being 15:1 and silver present in a range of 0.005% to 0.02%. Still further the tin to calcium ratio can be 20:1 and silver present in the range of 0.008% to 0.015%.

Aluminum can be eliminated or employed in a range of 0.008% to 0.03%.

While the grid supporting structure 14 has been shown in conjunction with a maintenance free battery 30, it can also be utilized in a sealed battery wherein an electrolyte is completely absorbed in the separator.

Industrial Applicability

An alloy composition is provided for positive grid in a SLI battery which alloy composition affords rapid hardening for manufacturability; improved hardness and low corrosion rate for extended service life and control of costs of manufacturing.

We claim:

1. A lead-acid cell comprising a container, at least one positive plate and a negative plate disposed within said container, a separator disposed within said container and separating said positive and negative plates; said positive plate comprising a grid supporting structure having a layer of active material pasted thereto, said grid supporting structure comprising a lead-based alloy consisting essentially of lead, tin in the range of about 0.8% to about 1.1%; the tin in a ratio to calcium of greater than about 12:1 and silver in the range of greater than 0 to about 0.015%, the percentages being based upon the total weight of said lead-based alloy.

2. The cell as defined in claim 1, wherein the ratio of tin to calcium is not less than 15:1.

3. The cell as defined in claim 1, wherein the ratio of tin to calcium is not less than 20:1.

4. The cell as defined in claim 1, wherein the silver content of said alloy is in the range of greater than 0 to about 0.0124%.

5. The cell as defined in claim 1, wherein calcium is present in an amount of about 0.03% to about 0.055% and the ratio of tin to calcium is not less than 15:1.

6. The cell as defined in claim 5, wherein silver is present in a range of about 0.005% to about 0.015%.

7. The cell as defined in claim 1, wherein calcium is present in an amount of about 0.03% to about 0.055% and the ratio of tin to calcium is not less than 20:1.

8. The cell as defined in claim 7, wherein silver is present in a range of about 0.008% to about 0.015%.

9. The cell as defined in claim 1, further including from about 0.008% to about 0.03% aluminum.

10. The cell as defined in claim 1, contained in a maintenance free battery.

11. The cell as defined in claim 1, contained in a sealed battery.

12. The cell as defined in claim 1, wherein the container, positive and negative plates and the separator comprise an automotive battery.

13. A grid supporting structure for use in a lead-acid battery having at least one positive plate and a negative plate disposed within said container, a separator disposed within said container and separating said positive and negative plates, the grid supporting structure having a layer of active material pasted thereto, said grid supporting structure comprising a lead-based alloy consisting essentially of lead, tin in the range of about 0.8% to about 1.1%; tin in a ratio to calcium of greater than about 12:1 and silver in the range of greater than 0 to about 0.015%, the percentages being based upon the total weight of said lead-based alloy.

14. The grid supporting structure as defined in claim 13, wherein the ratio of tin to calcium is not less than 15:1.

15. The grid supporting structure as defined in claim 13, wherein the ratio of tin to calcium is not less than 20:1.

16. The grid supporting structure as defined in claim 13, wherein the silver content of said alloy is in the range of greater than 0 to about 0.0124%.

17. The grid supporting structure as defined in claim 13, wherein calcium is present in an amount of about 0.03% to about 0.055% and the ratio of tin to calcium is not less than 15:1.

18. The grid supporting structure as defined in claim 17, wherein silver is present in a range of about 0.005% to about 0.015.

19. The grid supporting structure as defined in claim 17, wherein calcium is present in an amount of about 0.03% to about 0.055% and the ratio of tin to calcium is not less than 20:1.

20. The grid supporting structure as defined in claim 19, wherein silver is present in a range of about 0.008% to about 0.0150%.

21. The grid supporting structure as defined in claim 13, further including from about 0.008% to about 0.03% aluminum.

22. The cell as defined in claim 13, contained in a maintenance free battery.

23. The grid supporting structure as defined in claim 13, contained in a sealed battery.

24. A lead-acid cell comprising a container, at least one positive plate and a negative plate disposed within said container, a separator disposed within said container and separating said positive and negative plates, said positive plate comprising a grid supporting structure having a layer of active material pasted thereto, said grid supporting structure comprising a lead-based alloy consisting essentially of lead, tin in the range of about 0.8% to less than about 1.2%; the tin in a ratio to calcium of greater than about 12:1 and silver in the range of greater than 0 to about 0.015%, the percentages being based upon the total weight of said lead-based alloy.

25. A grid supporting structure for use in a lead-acid battery having at least one positive plate and a negative plate disposed within said container, a separator disposed within said container and separating said positive and negative plates; the grid supporting structure having a layer of active material pasted thereto, said grid supporting structure comprising a lead-based alloy consisting essentially of lead, tin in the range of about 0.8% to less than about 1.2%; tin in a ratio to calcium of greater than about 12:1 and silver in the range of greater than 0 to about 0.015%, the percentages being based upon the total weight of said lead-based alloy.

26. The cell as defined in claim 24, wherein the silver content of aid alloy is in the range of greater than 0 to about 0.0124%.e.

27. The grid supporting structure as defined in claim 25, wherein the silver content of said alloy is in the range of greater than 0 to about 0.0124%.

28. The cell as defined in claim 1, wherein the silver content of said alloy is in the range of about 0.005% to about 0.015%.

29. The cell as defined in claim 2, wherein the silver content of said alloy is in the range of about 0.005% to about 0.015%.

30. The cell as defined in claim 3, wherein the silver content of said alloy is in the range of about 0.005% to about 0.015%.

31. The grid supporting structure as defined in claim 13, wherein the silver content of said alloy is in the range of about 0.005% to about 0.015%.

32. The grid supporting structure as defined in claim 14, wherein the silver content of said alloy is in the range of about 0.005% to about 0.015%.

33. The grid supporting structure as defined in claim 15, wherein the silver content of said alloy is in the range of about 0.005% to about 0.015%.

* * * * *